(No Model.) 2 Sheets—Sheet 2.
W. D. ARNETT.
SEEDING MACHINE.
No. 359,832. Patented Mar. 22, 1887.
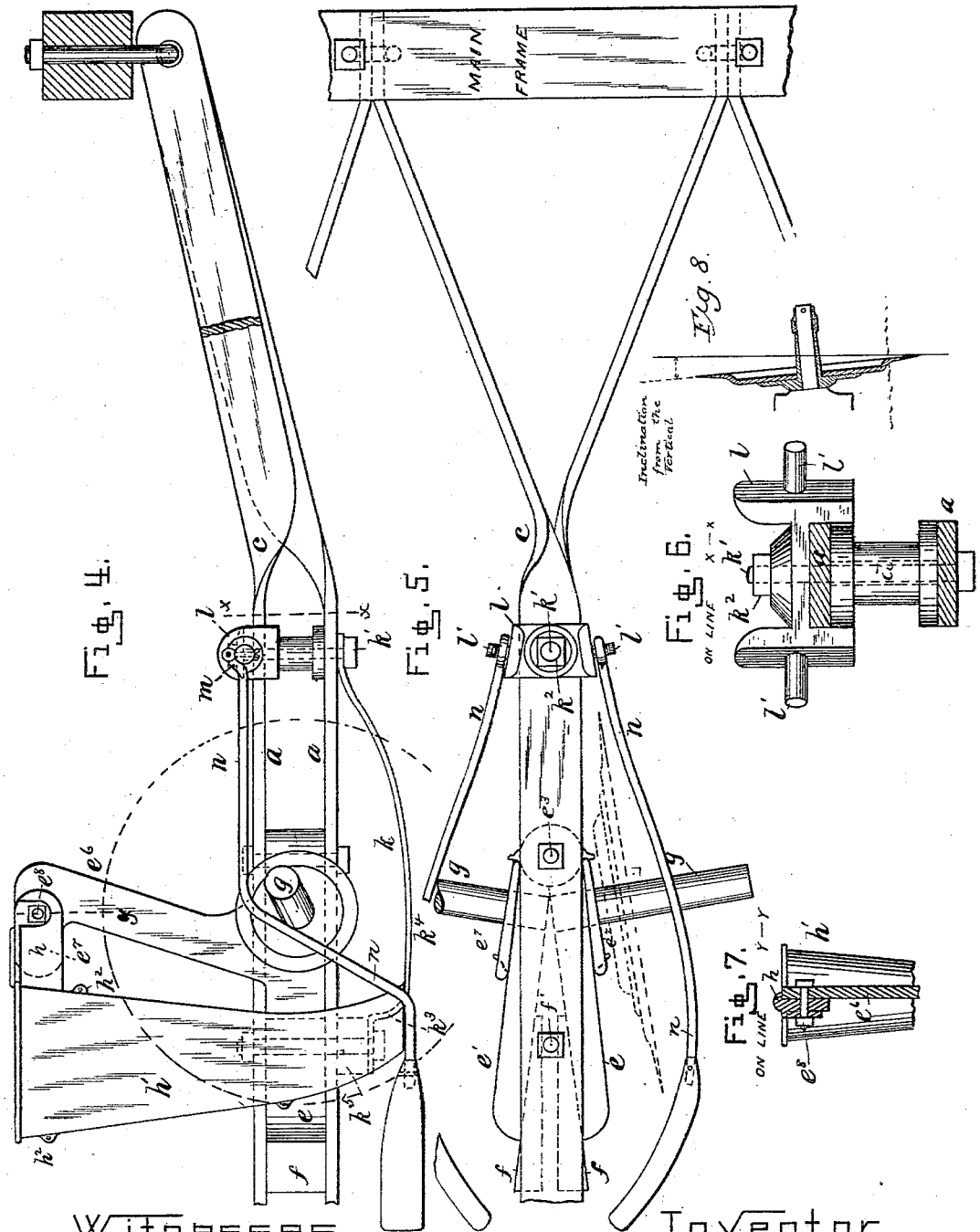

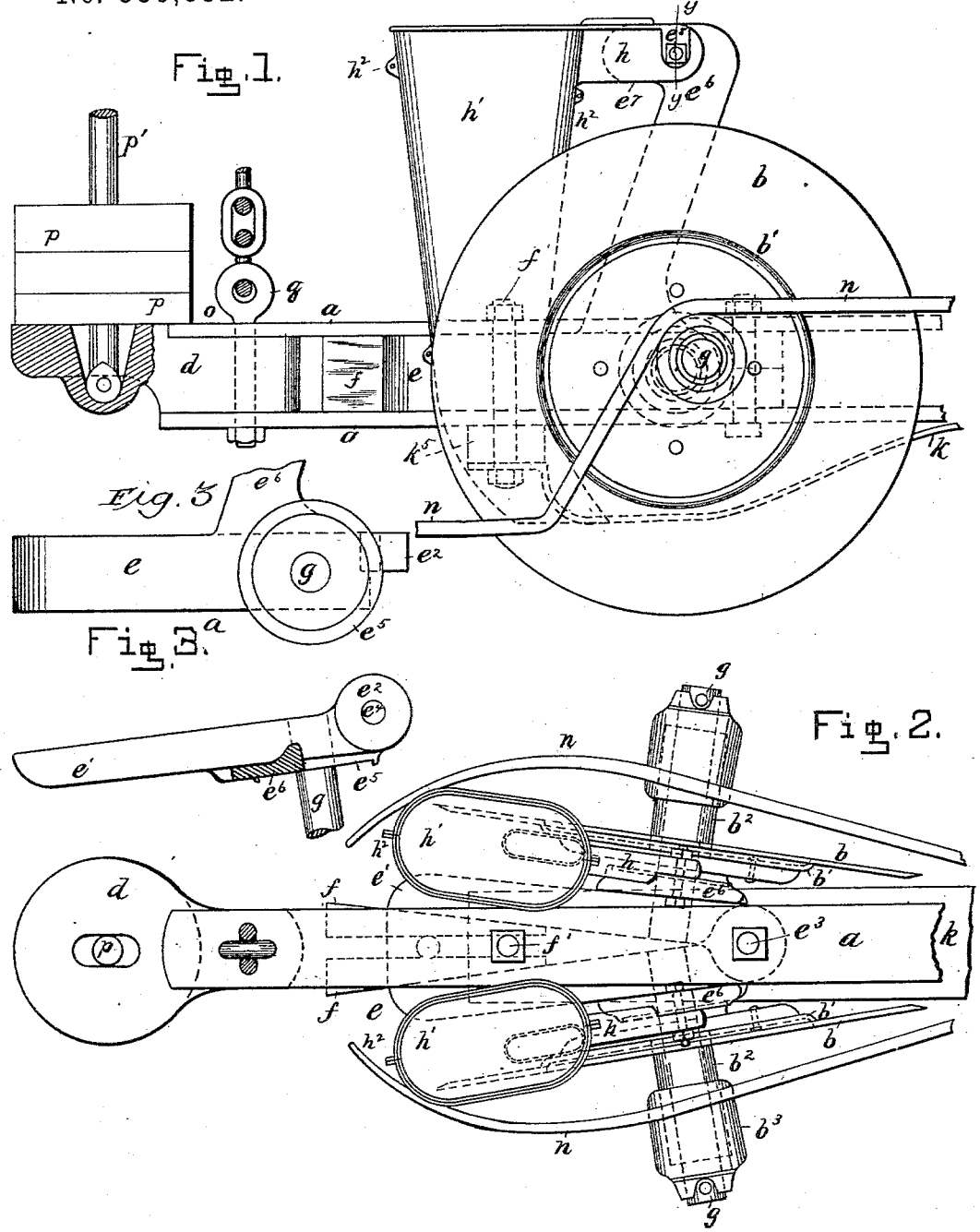

ns.

UNITED STATES PATENT OFFICE.

WILLIAM D. ARNETT, OF MORRISON, COLORADO.

SEEDING-MACHINE.

SPECIFICATION forming part of Letters Patent No. 359,832, dated March 22, 1887.

Application filed May 22, 1886. Renewed February 10, 1887. Serial No. 227,178. (No model.)

*To all whom it may concern:*

Be it known that I, WILLIAM D. ARNETT, of Morrison, in the county of Jefferson and State of Colorado, have invented certain Improvements in Seeding-Machines, of which the following is a specification.

My invention relates to seeding-machines and grain-drills in which the drag-bars are provided with upright disks arranged in planes oblique to the line of travel for the purpose of opening the seed-furrows; and the novel features are designed more particularly as improvements upon the inventions described in Letters Patent of the United States granted to me on the 24th day of February, 1885, No. 312,791, and on the 8th day of December, 1885, No. 331,753.

The objects of my present invention are, briefly stated, to produce a drag-bar which shall have the maximum of strength and the minimum of material, and to adapt this bar particularly for the attachment of the disks and their adjuncts; to provide improved means for effecting the adjustment of the disks in relation to each other and to the drag-bar; to secure by a novel position of the disks an improved action in the ground; to provide means for regulating the depth to which the disks enter the ground in forming the furrow, and to provide a simple and efficient means for covering the seed.

As the remaining portions of the machine may be of any ordinary construction, and have no special reference to my present invention, I have represented in the accompanying drawings only one of the drag-bars and the parts which immediately connect therewith.

Referring to the drawings, Figure 1 is a side elevation of the rear end of the drag-bar and the various parts attached thereto, the block at the extremity being shown in section. Fig. 2 represents a top plan view of the parts shown in the preceding figure. Fig. 3 is a side elevation of one of the disk-supporting plates, its upright arm being broken away. Fig. 3ª is a top plan view of the same. Fig. 4 is a side elevation of the drag-bar and seed-tube, the extreme rear end of the bar being broken away and the front disk removed to expose other parts to view. Fig. 5 is a top plan view of the parts shown in the preceding figure. Fig. 6 is a section on the line $x\,x$ of Fig. 4, showing particularly the block by which the covering-arms are sustained. Fig. 7 is a vertical section on the line $y\,y$ of Figs. 1 and 4, showing the connection of the seed-tube with its supporting-standard. Fig. 8 is a vertical section showing the inclination of the narrow opening-disks from the vertical.

My present drag-bar is intended, like that in Patent No. 331,753, to support two disks and the adjacent seed-tubes, and, like the original bar, is composed of two flat wrought-iron bars, $a\,a$. These bars, instead of having their wide faces presented in a vertical position throughout their entire length, as in the former patent, are each twisted or given a quarter-turn midway of its length, or thereabout, so that the rear ends present their broad faces in horizontal positions. The two bars diverge toward their forward ends, and are coupled to the main frame, as usual; but at their rear ends one bar is brought directly over the other and parallel therewith, being separated a distance of two or more inches by an intervening block, $d$, against which they are securely bolted or riveted. The bar thus constructed possesses great strength and rigidity in proportion to its weight both as to vertical and lateral strains, and presents between the rear ends of its two parts a horizontal slot or opening for the reception of the devices which support the disks.

Instead of maintaining the disks upon plates bolted to the drag-bar, as heretofore, I make use of plates connected to the drag-bar by vertical pivots and combined with adjusting devices by which they may be moved laterally around their pivots to vary the inclination and separation of the disks. These plates (shown at $e\,e'$ in the several figures) are adapted to overlap at their forward ends, and are inserted between the two members of the drag-bar and secured by a single pivot-bolt, $e^2$. Each plate is provided with an outwardly-projecting journal, $g$, commonly constructed of wrought-iron, and screwed, keyed, or otherwise secured therein. On these journals I mount the respective furrow-opening disks $b$, which may be of the form shown in the drawings, or of any other appropriate form. The journals have a forward inclination toward their ends, as represented in the several figures, whereby the forward edges of the two disks are thrown toward each other, the disks standing in an upright position in planes oblique to the line of progression, and their lower edges caused to open the furrow in a manner which will be readily understood.

Heretofore it has been customary to use disks having concave outer surfaces, and to arrange these disks to rotate in vertical planes. In practice I find that a better action of the parts is secured by giving the disk a slight inclination from the vertical, their lower edges being thrown outward beyond the upper edges, as shown in Fig. 8. This result I secure by giving the journals an upward inclination, as well as a forward inclination toward their outer ends. When the disks are thus inclined from the vertical, I prefer to construct them with flat outer faces near the periphery, as shown in the drawings, and particularly described in my application, Serial No. 199,137, filed April 16, 1886; but the inclination is also advantageous in connection with the disks of other and ordinary forms.

For the purpose of adjusting the disks laterally and varying their obliquity to the direction of the furrow and the extent of their separation, I introduce between their supporting-plates $e\ e'$, and between the upper and lower members of the drag-bar, two wedges, $f$, which act to force the plates $e\ e'$ apart, and to sustain them against the inward pressure exerted through the disks. These wedges are secured firmly in position by means of a vertical bolt, $f'$, passing downward between them through the drag-bar, and provided with a nut on one end, whereby it is enabled to draw the two parts of the bar firmly against the wedges from opposite sides.

The seed is conducted from the feed mechanism of the machine into the furrows formed by the respective disks by vertical spouts or conductors $h'\ h'$, arranged inside of the disks near their rear edges. Each feed-spout is provided at the top with a forwardly-extending arm or ear, $h$, connected by a horizontal pivot, $e^8$, to an arm, $e^6$, rising rigidly from the plate which carries the adjacent disk. This construction maintains a constant relation between the disk and the conductor.

The conductor is free to swing upward around its pivot in the event of its meeting an obstruction; but its descent is limited, and it is maintained in an operative position by means of a flange formed on the side of its arm $h$, and adapted to bear on top of the standard $e^6$, as shown in Figs. 1 and 7. The essential feature of the invention in this regard consists in adapting the standard and the conductor to interlock, and thus limit the pivotal motion of the conductor, and it is manifest that the details of form may be modified without changing the mode of action.

For the purpose of forcing the disk into the ground, I propose to use, in connection with the drag-bar, detachable or removable weights $p$, as described and claimed in my application, Serial No. 187,436, filed March 6, 1886. I now provide an improved means of supporting these weights, consisting in a block, $d$, between the two members of the drag-bar at the rear end, and provided with a cavity to receive the lower end of the guide-rod $p'$, which is pivoted therein, as shown in Fig. 1. The weights are applied around this rod in the same manner as in my application before referred to. I secure the block $d$ in place by means of a vertical eye-bolt, $q$, passing therethrough and through the drag-bar, this bolt serving the additional purpose, as shown, of receiving a chain by which to lift the drag-bar. In order to regulate the depth to which the edges of the disks enter the soil, and thus control the depth of the furrow, I apply to the under side of the drag-bar, between the two disks, an adjustable shoe or runner, $k$, bolted at its forward end to the under side of the drag-bar, and curved thence downward to a point between the disks in a suitable manner to bear on the surface of the ground, its rear extremity being continued upward and adjustably secured to the drag-bar. Devices of any appropriate character may be employed to effect the vertical adjustment of the shoe, in order to vary the depth of the furrow; but I recommend as the most simple and satisfactory device for the purpose removable blocks or washers $k^5$, inserted between the rear end of the shoe and the under side of the drag-bar. These may be secured in place by means of the bolt $f'$, which also serves as the pivot for the disk-carrying plates and as the means of holding the rear end of the shoe.

For the purpose of closing the furrow over the seed, and of avoiding the trouble which exists from the clogging or choking of the ordinary covering devices, I employ the peculiar covering-arms represented at $n$ in the several figures. Each of these coverers consists simply of a rod attached to the drag-bar in advance of the disks, and extending thence downward outside of the adjacent disk to the ground, with an inward curvature at the rear end. The rear end may be provided with a vertical plate forged into a suitable form, to act as a scraper to throw the earth inward. It will be perceived that the form of these arms is such that they present no corners or angles upon which obstructive matters can lodge. They act to turn the earth smoothly and easily into the respective furrows, and in the event of their meeting weeds or underbrush they will ride smoothly past the same.

I commonly form the scrapers with eyes at their forward ends, and mount these eyes upon journals $l'$, projecting from a casting, $l$, secured to the top of the drag-bar by a vertical bolt, $k'$, which, passing downward through the bar, retains the forward end of the shoe $k$ in position.

Having thus described my invention, what I claim is—

1. A drag-bar consisting of two connected bars having their forward ends separated horizontally for attachment to the frame and their rear ends arranged one directly over the other, substantially as described.

2. The drag-bar consisting of two flat metal bars, each having a quarter-twist midway of its length, their forward ends separated horizontally and their rear ends arranged one directly over the other, with their flat faces in a horizontal position, substantially as described.

3. In combination with a drag-bar and a furrow-opening disk oblique to the line of travel, a disk-supporting plate, a vertical pivot connecting said plate to the drag-bar, and means, substantially as described, for fastening the plate in position.

4. The drag-bar having the upper and lower members, in combination with the disk-supporting plates inserted between said members, the vertical pivot, and the adjustable wedges between the plates.

5. The drag-bar having the upper and lower members, the intermediate disk-supporting plates, and the adjusting-wedges, in combination with the bolt $f'$, acting to compress the bar upon the wedges and hold them in the required position.

6. In a seeding-machine, the combination of a wheeled frame, a vertically-swinging drag-bar jointed thereto, a furrow-opening disk journaled to said drag-bar, its axis standing in a plane oblique to the line of travel of the machine, and also at an inclination from the horizontal, and the seed-spout or conductor, also carried by said drag-bar, immediately behind the disk.

7. In combination with the drag-bar having the upper and lower members, the block $d$, secured between their rear ends, substantially as and for the purpose described.

8. In combination with a drag-bar and an oblique furrow-opening disk carried thereby, a shoe or runner attached to the beam and bearing on the ground opposite the disk, whereby the disk is caused to act at a uniform depth in traveling over uneven ground.

9. In combination with a drag-bar and two furrow-opening disks on opposite sides, a runner attached to the drag-bar and acting on the ground between the disks.

10. In combination with a drag-bar and a furrow-opening disk applied obliquely to its side, a runner applied to the bar adjacent to the side of the disk, and devices, substantially as shown, for adjusting the runner vertically in reference to the bar and disk.

11. In combination with a drag-bar and an oblique furrow-opening disk carried thereby, a furrow-closing arm extending from the bar past the outer side of the disk and curving inward in rear of the same.

12. In combination with the disk and the disk-supporting plate having an upright arm, $e^6$, the seed-conductor $h'$, pivoted to said arm and adapted to interlock therewith, substantially as described, whereby the tube is sustained in a proper position for action and permitted to swing freely upward.

13. In combination with the two-part drag-bar and its intermediate block, $d$, the runner, the coverer-sustaining plate $l$, and the single bolt $k'$, applied, as described, to connect said parts.

In testimony whereof I have hereunto set my hand, this 21st day of May, 1886, in the presence of two attesting witnesses.

WILLIAM D. ARNETT.

Witnesses:
WM. P. KENNEDY,
WILLIAM H. SHIPLEY.